C. E. Haskins.
Button.

No. 30,968.  Patented Dec. 18, 1860.

Witnesses:
J. R. Campbell
John P. Clarke

Charles E. Haskins

UNITED STATES PATENT OFFICE.

CHARLES E. HASKINS, OF PROVIDENCE, RHODE ISLAND.

SHIRT-STUD.

Specification of Letters Patent No. 30,968, dated December 18, 1860.

*To all whom it may concern:*

Be it known that I, CHARLES E. HASKINS, of the city and county of Providence and State of Rhode Island, have invented an Improved Shirt-Stud; and I do hereby declare the same to be fully described in the following specification and illustrated in the accompanying drawings, of which—

Figure 5:
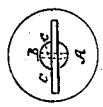
Figure 4:
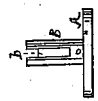
Figure 3:
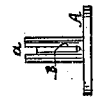
Figure 2:
Figure 1:
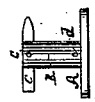

Figure 1, is a side view, and Fig. 2, a longitudinal section of the invention. Figs. 3 and 4, are representations of the two opposite sides of the recessed shank to be hereinafter described. Fig. 5, is a rear or underside view of the stud.

In the drawings A, is the head and B, the shank of my improved shirt stud. The former is a circular or other proper shaped plate, while the latter, viz, the shank, is a tube extended at right angles from one side of such plate and at or near its middle. This tube should also be so constructed as to have two recesses $a$, $b$, made in opposite sides of it, as shown in Figs. 2, 3, and 4, one recess, ($b$,) being longer than the other or has a depth equal to one half the length of a lever C, while the other has a depth equal to the width of such lever. The said lever is placed in these recesses, and crosswise of the shank and is held to the latter by a pin or fulcrum $c$, which is passed through such shank and the middle of the lever. Thus the lever, while parallel to the head A, will stand at right angles to the shank B, and project equally in opposite directions therefrom.

The shank, B, contains a spring D, whose force is exerted against the lever C, and so as to preserve it in its position, at right angles to the shank, and with its lower edge resting on the bottom of the notch or recess $a$. By turning the lever on its fulcrum, and so that one arm of such lever shall enter the recess, $b$, the spring will be contracted. The spring exhibited in the drawings is what is usually termed a V spring, its form and its arrangement relatively to the lever and the shank being as represented in Fig. 2. A pin or rivet, $d$, passed through the shank and eye of the spring serves to connect the spring with the shank.

To insert the stud in an eyelet hole made in a shirt bosom, it will be necessary to first pass into the hole, that lever arm which rests on the bottom of the recess, $a$. Next, the stud is to be pressed toward the eyelet. This will cause the lever to turn on its fulcrum and so as to allow the shank to enter the eyelet. As soon as the lever has been passed beyond the rear side of the eyelet, the spring in the shank will force the lever into a position at right angles to the shank, such a position of the lever causing it to hold the stud in connection with the eyelet. In order to remove the stud from the eyelet the lever must first be turned down into the recess, $b$.

I claim—

An improved shirt stud constructed, not only with its shank, tubular and recessed as explained, but with a lever applied and arranged with respect to such shank, as described and provided with a spring, arranged in the shank and operating so as to maintain the lever at right angles with the shank under circumstances as set forth.

CHARLES E. HASKINS.

Witnesses:
I. R. CAMPBELL,
JOHN S. CLARKE.